US005860016A

United States Patent [19]

Nookala et al.

[11] Patent Number: 5,860,016

[45] Date of Patent: Jan. 12, 1999

[54] ARRANGEMENT, SYSTEM, AND METHOD FOR AUTOMATIC REMAPPING OF FRAME BUFFERS WHEN SWITCHING OPERATING MODES

[75] Inventors: Narasimha R. Nookala, San Jose; Otto Sponring, Los Altos; Kameswaran Sivamani, Sunnyvale, all of Calif.

[73] Assignee: Cirrus Logic, Inc., Fremont, Calif.

[21] Appl. No.: 720,392

[22] Filed: Sep. 30, 1996

[51] Int. Cl.$^{6}$ .............. G06F 1/32

[52] U.S. Cl. .............. 395/750.06; 395/750.01; 395/750.03; 395/750.04; 395/750.05

[58] Field of Search .............. 395/750.01–750.08; 364/492; 711/104, 105, 106

[56] References Cited

U.S. PATENT DOCUMENTS

| | | | |
|---|---|---|---|
| 5,294,918 | 3/1994 | Preston et al. | 345/155 |
| 5,371,869 | 12/1994 | Lee | 395/559 |
| 5,426,759 | 6/1995 | Padgaonkar | 711/1 |
| 5,438,681 | 8/1995 | Mensch, Jr | 364/491 |
| 5,586,308 | 12/1996 | Hawkins et al. | 395/550 |
| 5,615,376 | 3/1997 | Ranganathan | 395/750.04 |
| 5,655,127 | 8/1997 | Rabe et al. | 395/750.04 |

FOREIGN PATENT DOCUMENTS

| | | | |
|---|---|---|---|
| 584 538 A | 3/1994 | European Pat. Off. | G06F 3/147 |

*Primary Examiner*—Meng-Ai T. An
*Assistant Examiner*—Ario Etienne
*Attorney, Agent, or Firm*—Frank D. Nguyen

[57] ABSTRACT

An arrangement, system, and method to allow a computer system to have a normal operating mode with full display capability and a low-power operating mode with reduced display capability is provided. The computer system automatically switches to the low-power operating mode from the normal operating mode following a programmable period of inactivity. While display data is retrieved from an external DRAM in the normal operating mode, display data is retrieved from an internal SRAM in the low-power operating mode. The computer system switches back to the normal operating mode when one of the predetermined activities is detected.

16 Claims, 7 Drawing Sheets

ARRANGEMENT, SYSTEM, AND METHOD FOR AUTOMATIC REMAPPING OF FRAME BUFFERS WHEN SWITCHING OPERATING MODES

FIELD OF THE INVENTION

The invention generally relates to computer systems, and more particularly relates to computer power-saving operating modes.

BACKGROUND OF THE INVENTION

With the advances of semiconductor and computer technology, computer systems are becoming faster and at the same time smaller in size. Desk-top and even lap-top computer systems now possess processing speeds of main-frame computers that used to fill up a small room. Even hand-held computer systems such as personal digital assistants (PDA), which are becoming more popular, are getting more powerful. As computer systems become more powerful and more miniaturized, power-conservation presents a difficult challenge to overcome. Because of their small size, hand-held computer systems are powered by batteries which have limited operating duration. Since more power is required for faster and more powerful processors, innovative solutions are often required to conserve power and thereby extend battery operating duration. To conserve power for hand-held computer systems, a common method is to introduce low-power operating modes for these systems.

Reference is now made to Prior Art FIG. 1 illustrating a block diagram of a typical hand-held computer system 10. Hand-held computer system 100 includes main controller 10, dynamic random access memory (DRAM) 100, liquid crystal display (LCD) 102, keyboard 103, and a communications device such as modem 104. Main controller 101 comprises central processing unit (CPU) 105, DRAM controller 106, LCD controller 107, and operating mode controller 108 which are linked together by internal bus 109. CPU 105 oversees the operations of DRAM controller 106, LCD controller 107, operating mode controller 108, as well as the peripheral devices namely keyboard 103 and modem 104. DRAM controller 106 controls data transfer between DRAM 101 and main controller 100. LCD controller 107 receives display data from DRAM controller 106 and in-turn provides the data to LCD 102 for display. Operating mode controller 108 performs power management by controlling the operating mode of main controller 100.

Hand-held computer systems may have three operating modes: NORMAL, IDLE, and STANDBY. In a NORMAL operating mode, a hand-held computer system executes a task and therefore requires all of its hardware elements namely the central processor (CPU), the liquid crystal display (LCD), the universal asynchronous receiver/transmitter (UART) unit, the oscillator etc. to be fully functioning. During the NORMAL operating mode, power is consumed is the full operating power.

An IDLE operating mode is a low-power mode. In an IDLE operating mode, the hand-held computer system functions but awaits for the next event (i.e., activity) such as a key press to generate an interrupt. Another event, for example, might be the receipt of data at the input port. In the IDLE operating state, all the hardware elements remain functioning, except for the CPU. During the IDLE operating mode, power consumed is about 25 percent of the NORMAL operating mode.

A STANDBY operating mode is the lowest power mode. In a STANDBY operating mode, the system has been inactive for a relatively long period of time and is therefore switched "off". In this mode, except for the wake-up circuitry, everything else including the LCD, the CPU, and the oscillator are turned off. During the STANDBY operating mode, power consumed is about 1 to 2 percent of the NORMAL operating mode.

During the STANDBY operating mode, LED display 103 is shutoff and DRAM controller 106 is put in a self-refresh mode to recharge the dynamic memory cells of DRAM 101 to retain the memory content. For some hand-held systems, it is desirable to have limited display at lower resolution during a new low-power operating mode. The limited display may be used, for example, to indicate the status information of the hand-held system. At the same time, it is desirable that the level of power consumption is minimized. This presents a challenge because under the Prior Art, providing display requires DRAM controller 106, LCD controller 107, LCD 102, and DRAM 101 to be turned on which results in excessive power consumption given the limited display capability desired for the STANDBY operating mode.

Thus, a need exists for an arrangement adapted to accommodate a low-power operating mode having reduced display capability for hand-held computer systems.

SUMMARY OF THE INVENTION

Accordingly, the present invention provides an arrangement to accommodate a low-power operating mode having reduced display capability for hand-held computer systems.

The present invention meets the above need with an arrangement to allow a computer system to have both a normal operating mode having full display capability and a low-power operating mode having reduced display capability. The arrangement comprises a main state machine, internal memory, external memory, a memory controller, and a display controller.

The main state machine is coupled to the memory controller and the display controller and generates control signals to the memory controller and the display controller to indicate whether the normal operating mode or the low-power operating mode is in effect. The memory controller is coupled to the internal memory, and the external memory. In response to a control signal from the main state machine indicating which operating mode is in effect, the memory controller switches between the internal and the external memory as a source of display data.

The display controller is coupled to the memory controller. In response to a control signal from the main state machine indicating which operating mode is in effect, the display controller initiating a request to the memory controller to fetch for display data. The memory controller fetches display data from either the internal memory or the external memory in response to the request. Upon receiving the data, the display controller outputs the display data.

All the features and advantages of the present invention will become apparent from the following detailed description of its preferred embodiment whose description should be taken in conjunction with the accompanying drawings.

BRIEF DESCRIPTION OF THE DRAWINGS

Prior Art

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
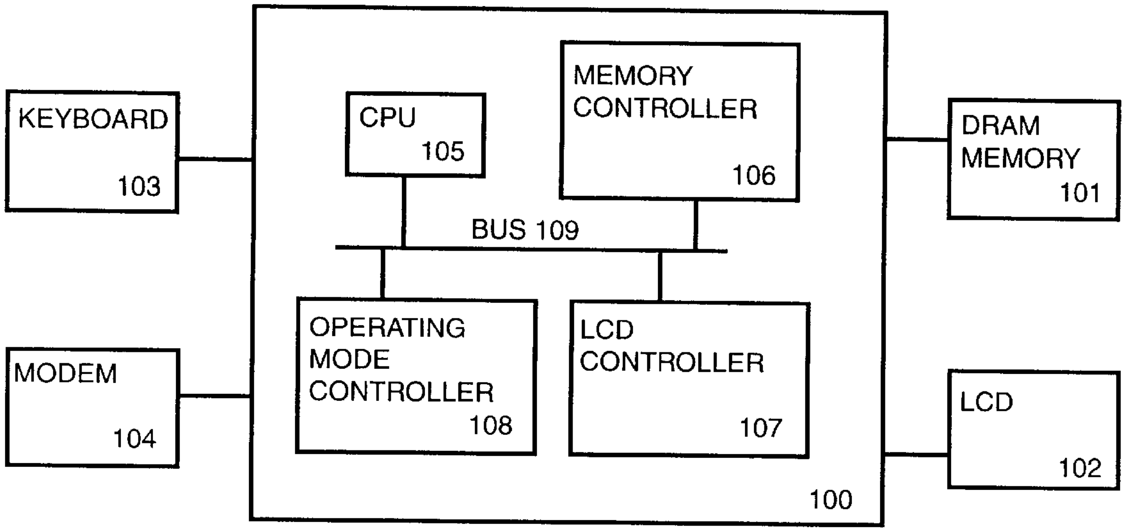
FIGURE 1 (Prior Art)
FIG. 1 is a block diagram illustrating a typical hand-held computer system.
Figure 2:
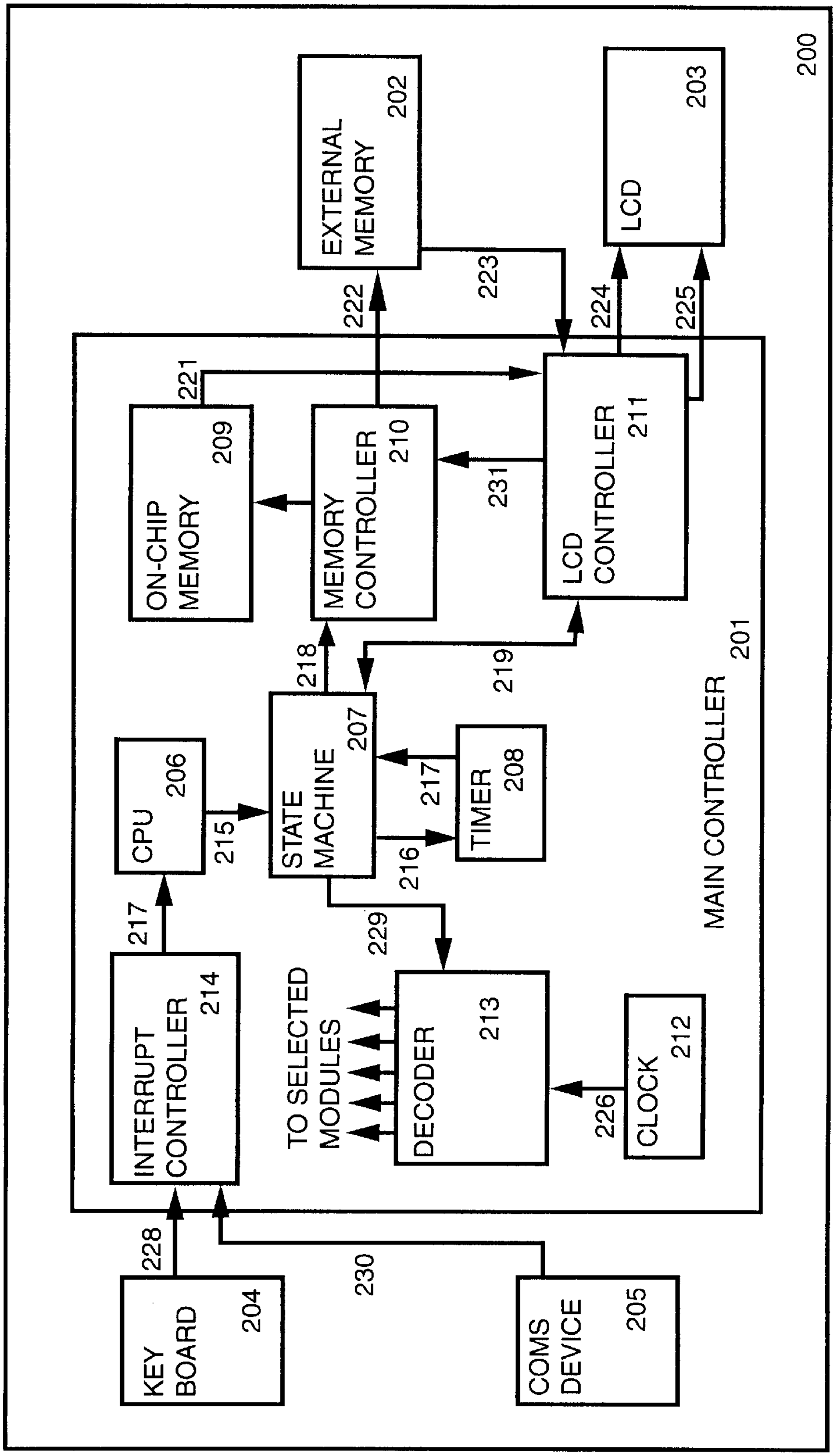
FIG. 2 is a block diagram illustrating a hand-held computer system in accordance with the present invention.

Reference is made to FIG. 2 illustrating a block diagram of hand-held computer system 200 in accordance with the present invention. Hand-held computer system 200 consists of main controller 201, external memory 202, LCD 203, keyboard 204, and communication device (e.g., modem) 205. Preferably, external memory 202 is a DRAM. In accordance with the present invention, main controller 201 comprises CPU 206, main state machine 207, timer 208, on-chip memory 209, memory controller 210, LCD controller 211, clock 212, decoder 213, and interrupt controller 214.

In addition to the operating modes NORMAL, IDLE, and STANDBY, main controller 201 has a SNOOZE operating mode which is a low-power operating mode in which limited display capability is provided. In the preferred embodiment, hand-held computer system 200 has a 420 pixels×240 pixels LCD screen. During the SNOOZE operating mode, up to 32 lines of display at 1 bit per pixel resolution may be provided. In comparison, 420 lines of display at 4 bits per pixel resolution are available for full display capability during the NORMAL operating mode.

As shown in FIG. 2, CPU 206 supplies control signal 215 to main state machine 207 indicating whether the SNOOZE or the STANDBY operating mode is chosen as the default low-power operating mode following a predetermined period of inactivity. Main state machine 207 supplies signal 216 to set timer 208 used in monitoring the period of inactivity. Timer 208 sends signal 217 to indicate to main state machine 207 whether the period of inactivity has been reached. Main state machine 207 resets timer 208 every time interrupt controller 214 detects any activity such as a keyboard press via signal 228 from keyboard 204 or incoming data via signal 230 from communications device 205. It should be clear that the interrupt controller 214 or a substantially similar controller is well-understood by a person of ordinary skill in the art and is commercially available.

Main state machine 207 supplies control signal 229 which indicates the current operating mode to decoder 213. Depending on the current operating mode, decoder 213 selectively provides clock signal 226 from oscillator 212 to the different modules of main controller 201 namely CPU 206, LCD 203, memory controller 211, etc. For example, during the NORMAL operating mode, clock signal 226 is provided to all modules of main controller 201. Conversely, in a low-power operating mode such as SNOOZE, clock signal 226 is provided to only selected modules.

Main state machine 207 provides control signal 218 to memory controller 210 to instruct memory controller 210 whether to retrieve display data from on-chip memory 209 or from external memory 202. While display data is retrieved from external memory 202 during the NORMAL operating mode, display data is retrieved from on-chip memory 209 during the SNOOZE operating mode. In the preferred embodiment, on-chip memory 209 is a static random access memory (SRAM) and external memory 202 is a DRAM. On-chip memory 209 is used in the SNOOZE operating mode to provide limited display capability. As discussed earlier, up to 32 lines of display at 1 bit per pixel resolution are available during the SNOOZE operating mode. Given that there are 420 pixels per line, this translates to approximately 2 Kbytes of data (i.e., 16380 data bits). Accordingly, in the preferred embodiment, on-chip memory 209 has a capacity of 2 Kbytes. It is to be appreciated that having an on-chip (i.e., internal) memory is important in the present invention because further power conservation is realized.

Prior to the start of the SNOOZE operating mode, main state machine 207 instructs memory controller 210 to put external memory 202, which is a DRAM in the preferred embodiment, in the self-refresh mode. Main state machine 207 communicates to LCD controller 211 the current operating mode of main controller over signal 219. In doing so, LCD controller 211 can take the necessary steps to switch from full display in the NORMAL operating mode to the limited display in the SNOOZE operating mode and vice versa. These steps are discussed in further details in FIGS. 3 and 4. Upon being ready, LCD controller 211 makes a request over signal 231 to memory controller 210 to retrieve the display data from the appropriate memory (i.e., on-chip memory 209 or external memory 202) depending on the operating mode.

To retrieve data from on-chip memory 209, memory controller 210 supplies signal 220 which includes address information, command instruction, and output enable signal to on-chip memory 209. In response, on-chip memory 209 provides display data to LCD controller 211 over signal 221. To retrieve data from external memory 202, memory controller 210 supplies signal 222 which includes row address strobe (RAS), column address strobe (CAS), and output enable signal to external memory 202. In response, external memory 202 provides display data to LCD controller 211 over signal 223. It should be clear that the memory controller 210 or a substantially similar controller is well-understood by a person of ordinary skill in the art and is commercially available.

Upon receiving display data from either on-chip memory 209 or external memory 202, LCD controller 211 then provides the display data to LCD 203 over signal 224. When main controller 201 switches from a NORMAL operating mode to a SNOOZE operating mode and vice versa, LCD controller 211 monitors the display line count and compares it against the programmed number of lines for the current operating mode display frame to determine the start of a new display frame. In doing so, LCD controller 211 can determine when to start providing display data received to LCD 203. This allows LCD 203 to operate in the current operating mode until the end of the current display frame. For reference, LCD controller 211 generates and provides the frame sync signal to LCD 203 over signal 225. It should be clear that the LCD controller 211 or a substantially similar controller is well-understood by a person of ordinary skill in the art and is commercially available.

Figure 3:
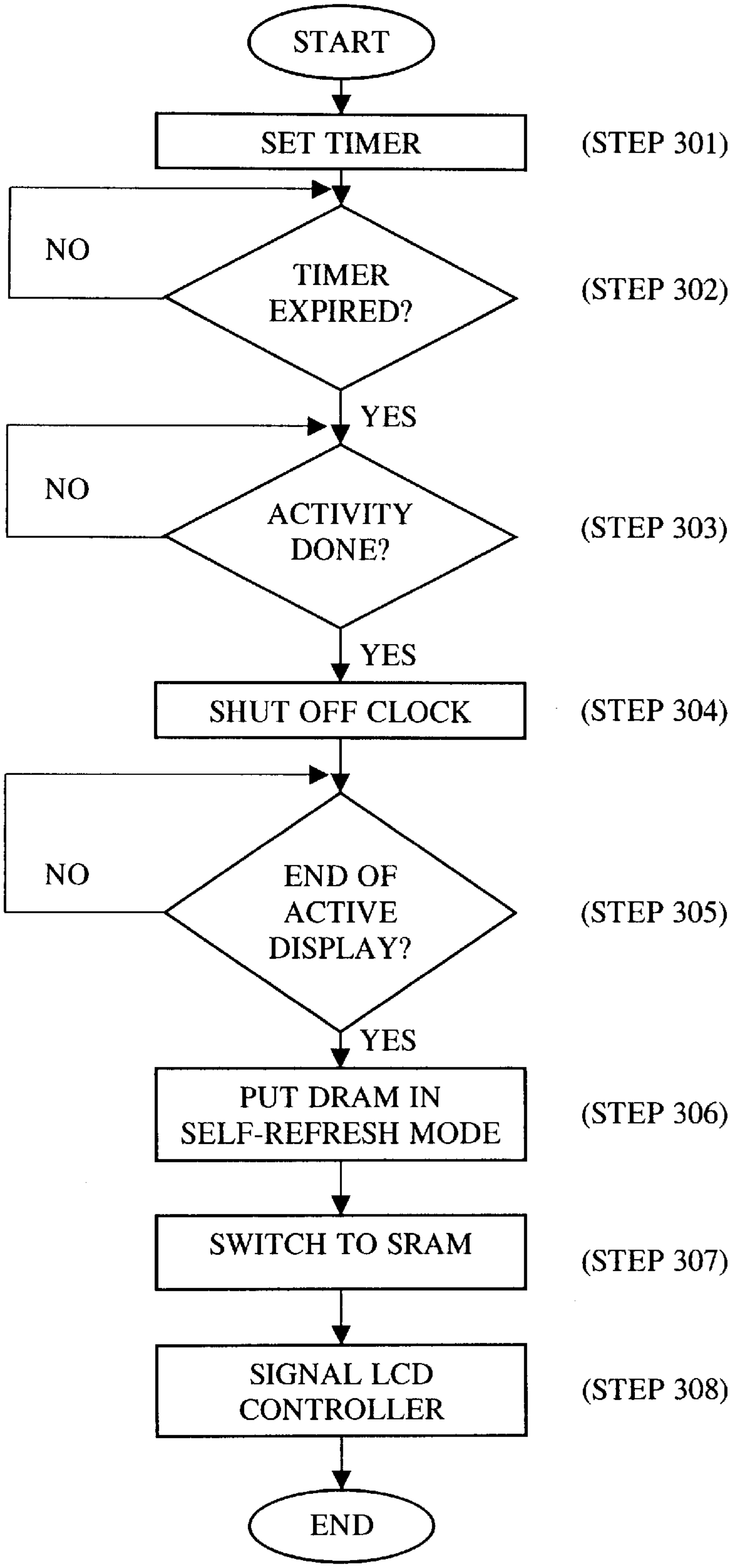
FIG. 3 is a flow chart of the main state machine in FIG. 2 illustrating the operation steps to switch from the NORMAL operating mode to the SNOOZE operating mode.

Referring to FIG. 3 which illustrates the operation steps of main state machine 207 to switch from a NORMAL operating mode to a SNOOZE operating mode assuming that the SNOOZE operating mode has been selected as the default low-power operating mode. In the preferred embodiment, selecting the SNOOZE operating mode as the default mode can be accomplished by setting the SNOOZEN bit of register SYSCON inside CPU 206. As illustrated in FIG. 3, main state machine 207 starts timer 208 in step 301 to monitor the period of inactivity. Timer 208 is reset by main state machine 207 when there is an activity such as the pressing of a keyboard key or the reception of data by communication device 205. Otherwise, if timer 208 expires before any activity is registered, timer 208 sends signal 217 to main state machine to indicate that hand-held computer system 200 should be in the SNOOZE operating mode.

Accordingly, main state machine monitors signal 217 to determine whether it should switch to SNOOZE (step 302). If signal 217 indicates that timer 208 has not expired, main state machine 207 continues to monitor signal 217. Conversely, if signal 217 indicates that timer 208 has expired, main state machine 207 makes sure that there is no on-going activity/tasks performed by hand-held system 200 (step 303).

If there is on-going activity/task, main state machine 207 waits for the completion of the activity/task. Otherwise, main state machine 207 sends signal 229 to decoder 213 to shut off clock signal 226 to all of the modules, including CPU 206, except LCD controller 211 and memory controller 210. (step 304). Main state machine 207 allows the end of the current video frame to be reached before switching from full display to limited display under SNOOZE (step 305). To do so, main state machine 207 allows memory controller 210 to continue fetching data from external memory 202 and passing this data to LCD controller 211 for downloading to LCD 203. However, when the end of the current video frame is reached as signified by frame sync signal 225, main state machine 207 signals memory controller 210 to put external memory 202 in self-refresh mode (step 306), assuming that external memory 202 is a DRAM. Main state machine 207 also signals memory controller 210 to switch to on-chip memory 209 as the source for display data (step 307). Main state machine 207 then signals LCD controller 211 to notify it that SNOOZE mode is in effect.

Figure 4:
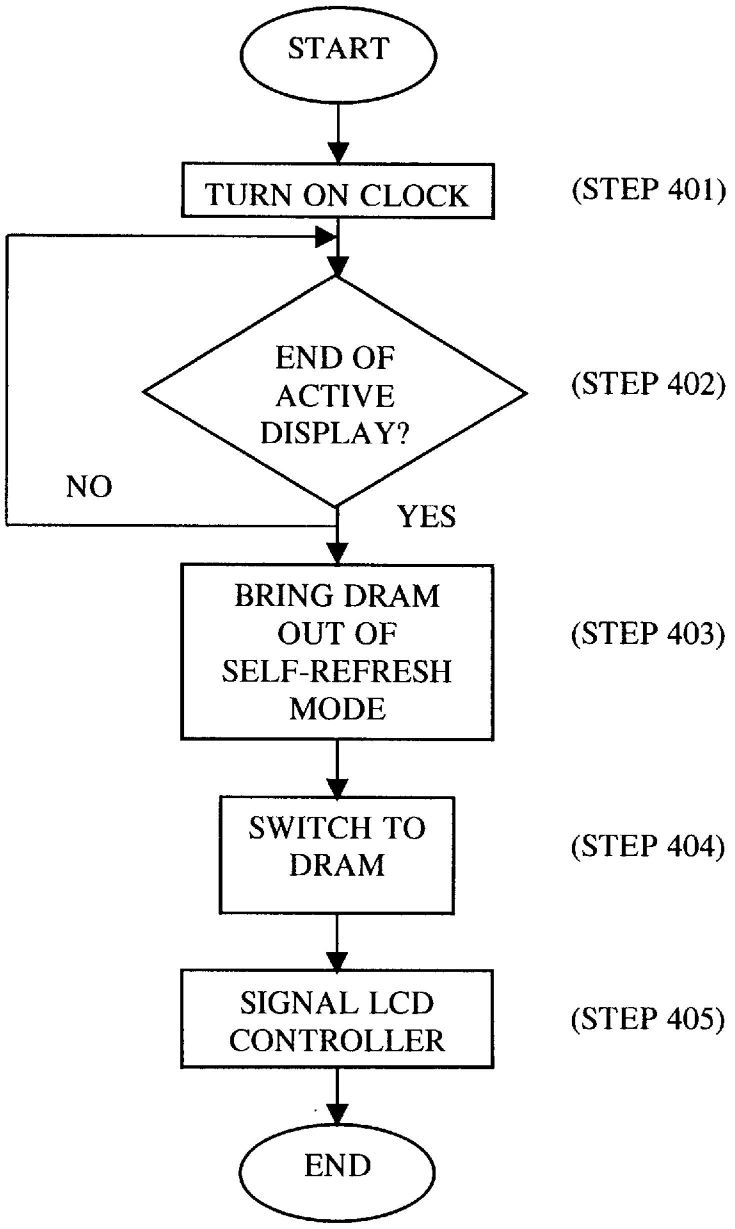
FIG. 4 is a flow chart of the main state machine in FIG. 2 illustrating the operation steps to switch from the SNOOZE operating mode back to the NORMAL operating mode.

Reference is now made to FIG. 4 which illustrates the operation steps of main state machine 207 to switch from a SNOOZE operating mode back to a NORMAL operating mode. Generally, a switch from SNOOZE back to NORMAL is made when a wake-up interrupt is received from interrupt controller 214. Such wake-up interrupt may originate, for example, from the pressing of keyboard key.

Upon receiving a wake-up interrupt, main state machine 207 turns on the clock to CPU 206 and other modules (step 401). Next, main state machine 207 makes certain that the end of current video frame is reached before switching from limited display to full display (step 402). Main state machine 207 allows memory controller 210 to continue fetching data from on-chip memory 209 and passing this data to LCD controller 211 for downloading to LCD 203 until the end of the current display frame. The frame sync signal indicates that the end of the current video frame is reached.

Next, main state machine 207 signals memory controller 210 to bring external memory 202 out of self-refresh mode (step 403), assuming that external memory 202 is a DRAM. Main state machine 207 also signals memory controller 210 to switch to external memory 202 as the source for display data (step 404). Main state machine 207 then signals LCD controller 211 to notify it that NORMAL mode is in effect.

Figure 5:
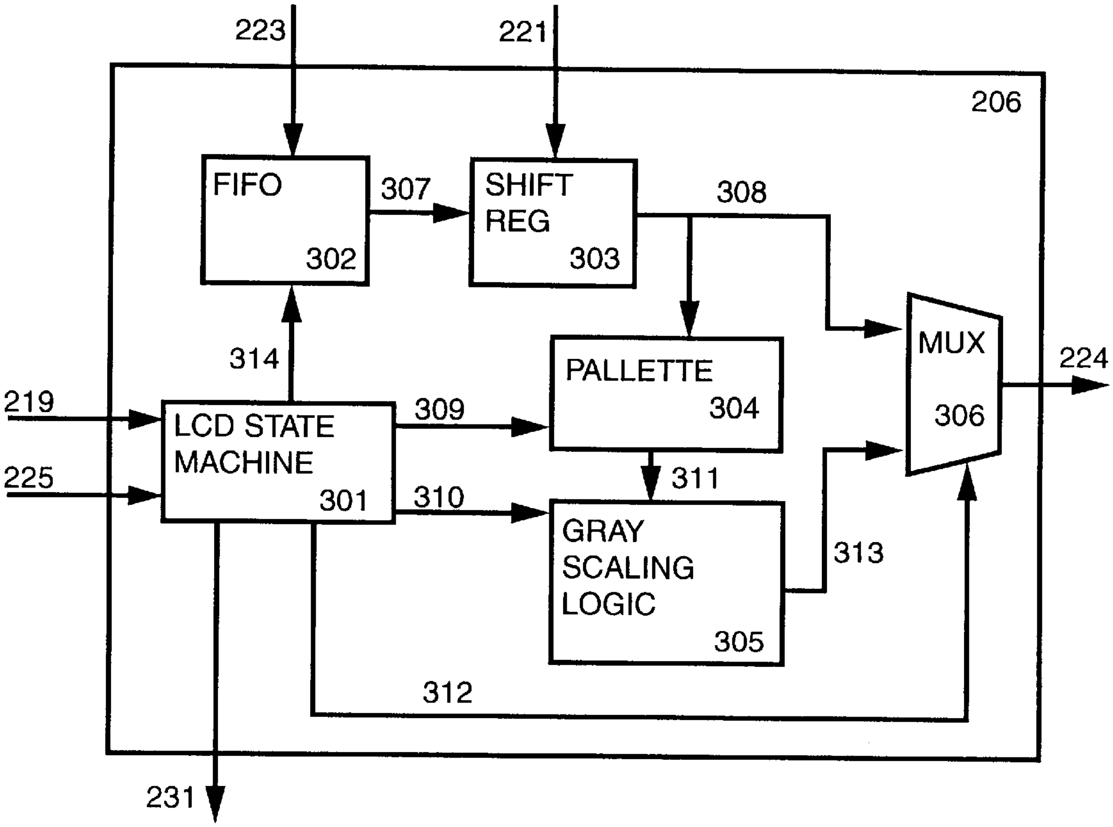
FIG. 5 is a block diagram illustrating the LCD Controller shown in FIG. 2 in accordance with the present invention.

Referring now to FIG. 5 illustrating a block diagram of LCD controller 206. LCD controller consists of LCD state machine 301, FIFO buffer 302, shift register 303, pallette 304, gray scaling logic 305, and multiplexer 306. LCD state machine 301 receives as input signal 219 from main state machine 207 which indicates to LCD controller 301 the current operating mode (i.e., SNOOZE, NORMAL, etc.). In response, LCD state machine 301 generates request signal 231 to memory controller 205, control signals 309 and 310 to pallette 304 and gray scaling logic 305 respectively, and select signal 312 to multiplexer 306.

Request signal 231 requests memory controller 205 to fetch data from either on-chip memory 209 or external memory 202. From the discussion above, by the time main state machine 207 signals LCD controller 211, main state machine has already communicates to memory controller 210 from where to retrieve display data. Display data is retrieved from on-chip memory 209 in the SNOOZE mode and from external memory 202 in the NORMAL mode. Display data retrieved from either on-chip memory 209 or external memory 202 is first sent to FIFO buffer 302. The data is then loaded into shift register 303 over signal 307. Shift register 303 serially shifts data into pallette 304 over signal 308. Pallette 304 is a RAMDAC storing a large number of different shades of colors used in full color display. In short, pallette 304 is a color look-up table which uses display information from external memory 202 to look up additional display colors.

Pallette 304 outputs signal 311 to gray scaling logic 305. Gray scaling logic 305 uses time-averaging logic to process display pixels thereby giving them additional shades of gray. Both pallette 304 and gray scaling logic 305 are used to create full display in the NORMAL operating mode. Accordingly, both pallette 304 and gray scaling logic 305 are turned off during the SNOOZE operating mode.

Control signals 309 and 310 are used to activate pallette 304 and gray scaling logic 305, respectively during the NORMAL operating mode and to deactivate during the SNOOZE operating mode. In addition to being provided as an input to pallette 304, signal 308 is also provided as input to multiplexer 306 thereby allowing both pallette 304 and gray scaling logic 305 to be bypassed during the SNOOZE operating mode. Under select signal 312, multiplexer 306 allows signal 308 to pass through as its output in the SNOOZE mode and signal 313 to pass through as its output in the NORMAL mode.

Figure 6:
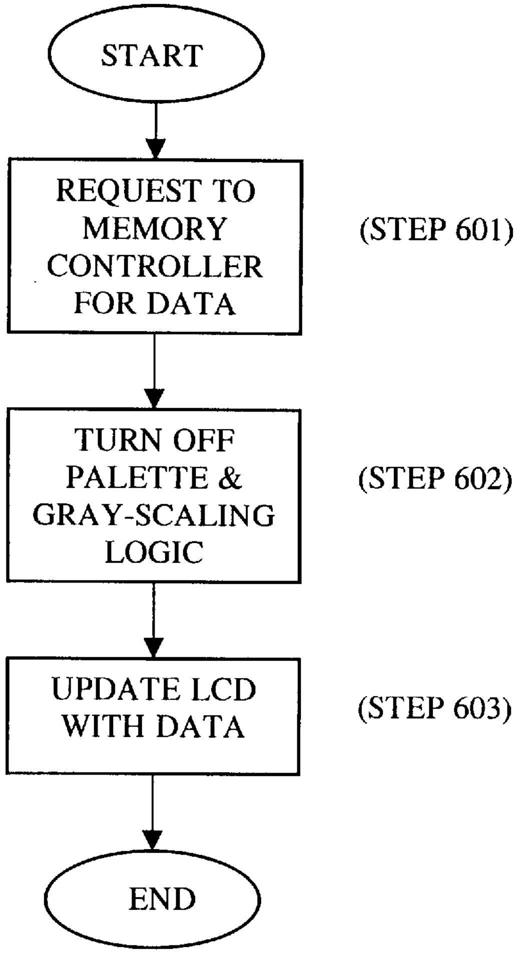
FIG. 6 is a flow chart of the LCD state machine in FIG. 5 illustrating the operation steps required in carrying out the SNOOZE operating mode.

FIG. 6 illustrates the operation steps of LCD state machine 301 in carrying out the SNOOZE operating mode. In step 601, LCD state machine 301 generates and sends request signal 231 to memory controller 205 for data. LCD state machine 301 then generates signals 309 and 310 to turn off pallette 304 and gray scaling logic 305 (step 602). To update LCD 203 with data (step 603), LCD state machine 301 generates and sends select signal 312 to order multiplexer 306 to allow signal 308 to pass through to LCD 203. In doing so, both pallette 304 and gray scaling logic 305 are bypassed. As discussed above, display data from on-chip memory 209 is provided to LCD 203 only when the end of the current NORMAL operating mode display frame is reached.

Figure 7:
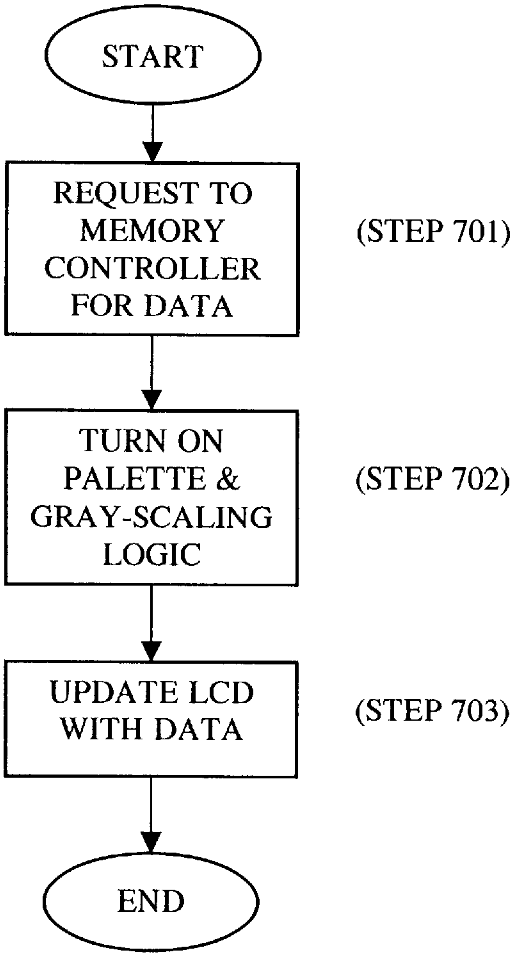
FIG. 7 is a flow chart of the LCD state machine in FIG. 5 illustrating the operation steps required in switching out of the SNOOZE operating mode.

Conversely, FIG. 7 illustrates the operation steps of LCD state machine 301 in switching back to the NORMAL operating mode from the SNOOZE operating mode. In step 701, LCD state machine 301 generates and sends request signal 231 to memory controller 205 for data. LCD state machine 301 then generates signals 309 and 310 to turn on pallette 304 and gray scaling logic 305 (step 702). To update LCD 203 with data (step 703), LCD state machine 301 generates and sends select signal 312 to order multiplexer 306 to allow signal 313 to pass through to LCD 203. In doing so, both pallette 304 and gray scaling logic 305 are not bypassed and full color display is therefore achieved. As discussed above, display data from external memory 202 is provided to LCD 203 only when the end of the current SNOOZE operating mode display frame is reached.

The preferred embodiment of the present invention, an arrangement to allow a computer system to have a normal operating mode with full display capability and a low-power operating mode with reduced display capability, is thus described. While the present invention has been described in particular embodiments, the present invention should not be construed as limited by such embodiments, but rather construed according to the below claims.

What is claimed is:

1. An apparatus to allow a computer system to have both a normal operating mode having full display capability and a low-power operating mode having a reduced display capability, comprising:

a main state machine, the main state machine generating a plurality of control signals to indicate whether the normal operating mode or the low-power operating mode is in effect;

internal memory;

external memory;

a memory controller coupled to the main state machine, the internal memory, and the external memory, the memory controller switching to the internal memory as a source of display data when operating in the low-power operating mode and to the external memory as a source of display data when operating in the normal operating mode in response to a first control signal from the main state machine; and a display controller coupled to the memory controller and the main state machine, the display controller comprising a pallette and a gray scaling logic to provide enhanced color data in the normal operating mode, the display controller initiating a request to the memory controller to fetch for display data in response to a second control signal from the main state machine, the memory controller fetching display data from the internal memory or the external memory in response to the request, upon receiving the display data the display controller outputting the display data, wherein the display data bypasses the pallette and gray scaling logic in the low-power operating mode, the display controller switches off the pallette and the gray scaling logic in the low-power operating mode.

2. The arrangement of claim 1 further comprising a timer circuit coupled to the main state machine, the timer circuit monitoring a period of inactivity, the timer circuit indicating to the main state machine when the period of inactivity expires thereby signifying to the main state machine that the low-power operating mode is in effect.

3. The arrangement of claim 2 further comprising an interrupt controller coupled to the main state machine, the interrupt controller monitoring predetermined activities, the interrupt controller indicating to the main state machine when any of the predetermined activities occurs, the main state machine resetting the timer circuit when any of the predetermined activities occurs.

4. The arrangement of claim 3 further comprising a power management circuit coupled to the main state machine, the power management circuit providing a system clock signal to predetermined modules upon receiving a third control signals from the main state machine indicating that the low-power operating mode is in effect.

5. The arrangement of claim 1, wherein the internal memory is static random access memory.

6. The arrangement of claim 1, wherein the external memory is dynamic random access memory.

7. The arrangement of claim 6, wherein the memory controller putting the external memory in a self-refresh mode during the low-power operating mode.

8. A computer system having a normal operating mode with full display and a low-power operating mode with reduced display comprising:

a display;

external memory;

an input device;

a main controller coupled to the display, the external memory, and the input device, the main controller comprising:

a central processing unit (CPU);

a main state machine, the main state machine generating a plurality of control signals to indicate whether the normal operating mode or the low-power operating mode is in effect;

internal memory;

a memory controller coupled to the main state machine, the internal memory, and the external memory, the memory controller switching to the internal memory as a source of display data when operating in the low-power operating mode and to the external memory as a source of display data when operating in the normal operating mode in response to a first control signal from the main state machine; and a display controller coupled to the memory controller and the main state machine, the display controller comprising a pallette and a gray scaling logic to provide enhanced color data in the normal operating mode, the display controller initiating a request to the memory controller to fetch for display data in response to a second control signal from the main state machine, the memory controller fetching display data from the internal memory or the external memory in response to the request, upon receiving the display data the display controller outputting the display data, wherein the display data bypasses the pallette and gray scaling logic in the low-power operating mode, the display controller switches off the pallette and the gray scaling logic in the low-power operating mode.

9. The computer system of claim 8, wherein the main controller further comprising a timer circuit coupled to the main state machine, the timer circuit monitoring a period of inactivity, the timer circuit indicating to the main state machine when the period of inactivity expires thereby signifying to the main state machine that the low-power operating mode is in effect.

10. The computer system of claim 9, wherein the main controller further comprising an interrupt controller coupled to the main state machine, the interrupt controller monitoring predetermined activities, the interrupt controller indicating to the main state machine when any of the predetermined activities occurs, the main state machine resetting the timer circuit when any of the predetermined activities occurs.

11. The computer system of claim 10, wherein the main controller further comprising a power management circuit coupled to the main state machine, the power management circuit providing a system clock signal to predetermined modules upon receiving a third control signals from the main state machine indicating that the low-power operating mode is in effect.

12. The computer system of claim 8, wherein the internal memory is static random access memory.

13. The computer system of claim 8, wherein the external memory is dynamic random access memory.

14. The computer system of claim 13, wherein the memory controller putting the external memory in a self-refresh mode during the low-power operating mode.

15. A method for switching from a normal operating mode having full display to a low-power operating mode having reduced display in a computer system comprising a plurality of module, the method comprising:

a) setting a timer:

b) resetting the timer when predetermined activities occur;

c) when the timer expires, waiting for any on-going activity to complete;

d) shutting off a system clock signal to predetermined modules;

e) waiting for an active display to be completed;

f) putting an external RAM from which display data are being retrieved on self refresh mode;

g) switching display data source from the external RAM to an internal RAM;

h) retrieving display data from the internal RAM;

i) turning off circuitry designed to enhance display data color during the normal operating mode; and j) sending the display data directly to display monitor and bypassing the display data color enhancing circuitry.

16. The method of claim 15, wherein to switch back from the low-power operating mode having reduced display to the normal operating mode having full display, the method further comprising:

k) turning on the system clock signal to all modules;

l) waiting for an active display to be completed;

m) bringing the external RAM out of self-refresh mode;

n) switching display data source from the internal RAM to the external RAM;

o) retrieving display data from the external RAM;

p) turning on circuitry designed to enhance display data color during the normal operating mode, and q) sending the display data through the display data color enhancing circuitry to display monitor.

* * * * *